(12) United States Patent
Yao

(10) Patent No.: US 9,104,596 B2
(45) Date of Patent: Aug. 11, 2015

(54) MEMORY SYSTEM

(71) Applicant: KABUSHIKI KAISHA TOSHIBA, Tokyo (JP)

(72) Inventor: Hiroshi Yao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 14/017,259

(22) Filed: Sep. 3, 2013

(65) Prior Publication Data

US 2014/0195874 A1 Jul. 10, 2014

(30) Foreign Application Priority Data

Jan. 8, 2013 (JP) .................................. 2013-000939

(51) Int. Cl.
*G11C 29/00* (2006.01)
*G06F 11/10* (2006.01)

(52) U.S. Cl.
CPC .................................. *G06F 11/1048* (2013.01)

(58) Field of Classification Search
CPC ............... G11C 29/808; G11C 29/846; G11C 11/5621; G11C 16/3418; G06F 11/1068
USPC .................................................. 714/764, 773
See application file for complete search history.

(56) References Cited

U.S. PATENT DOCUMENTS

| 7,164,602 B2* | 1/2007 | Hamamoto et al. ..... 365/185.09 |
| 7,607,074 B2 | 10/2009 | Takeuchi |
| 8,094,500 B2* | 1/2012 | Paley et al. .............. 365/185.12 |
| 2006/0120162 A1 | 6/2006 | Fujiu et al. |
| 2008/0049525 A1* | 2/2008 | Beer ............................ 365/200 |
| 2008/0094899 A1* | 4/2008 | Honma et al. ........... 365/185.09 |
| 2009/0147581 A1* | 6/2009 | Isobe ....................... 365/185.09 |
| 2012/0002469 A1 | 1/2012 | Imamoto et al. |
| 2013/0024747 A1* | 1/2013 | Sharon et al. ................. 714/773 |

FOREIGN PATENT DOCUMENTS

| JP | 2000-251484 A | 9/2000 |
| JP | 2006-228394 A | 8/2006 |
| JP | 2008-051419 A | 3/2008 |
| JP | 2011-233209 A | 11/2011 |
| JP | 2013-131095 A | 7/2013 |

* cited by examiner

*Primary Examiner* — David Ton
(74) *Attorney, Agent, or Firm* — Patterson & Sheridan, LLP

(57) ABSTRACT

According to one embodiment, a memory device includes a memory unit including a first subunit and a second subunit, a code encoding unit configured to calculate first redundant data based on first write data and second redundant data based on second write data, and a control unit configured to cause the first write data and the first redundant data to be written in the first subunit and the second write data and the second redundant data to be written in the second subunit. The control unit is configured to control the code encoding unit to start calculation of the second redundant data after all of the writing steps for writing the first write data and the first redundant data have been carried out.

20 Claims, 11 Drawing Sheets

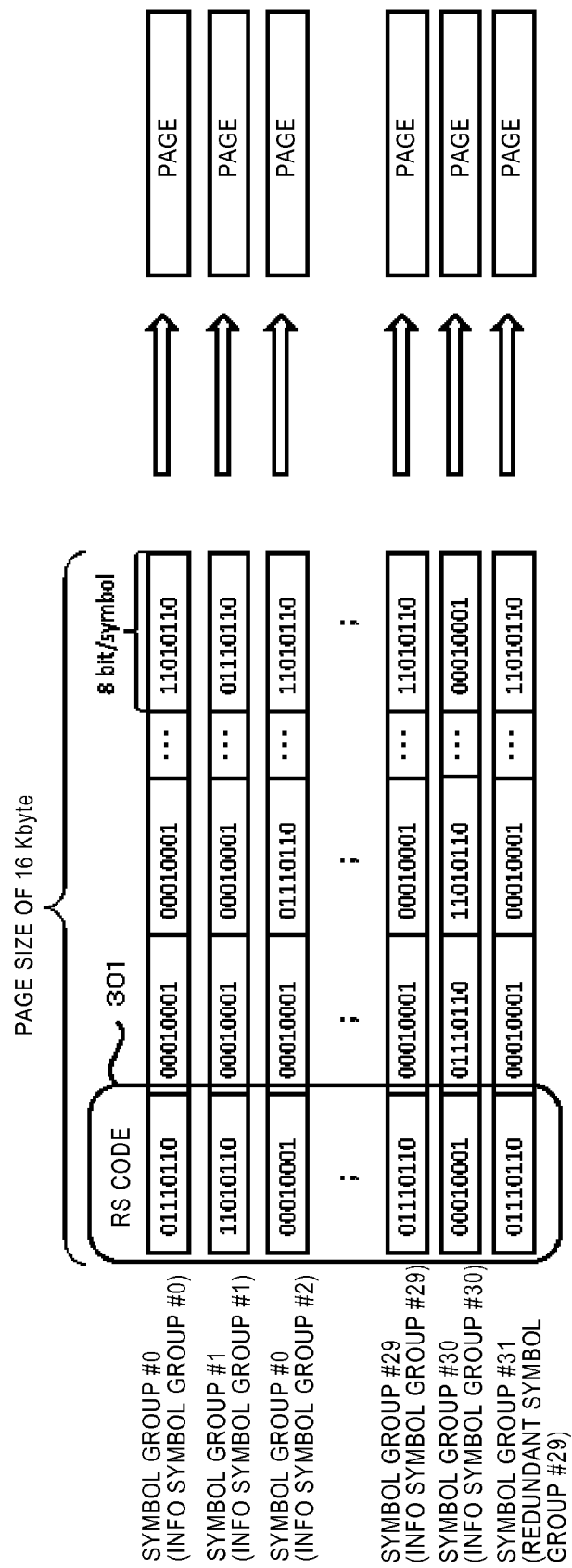

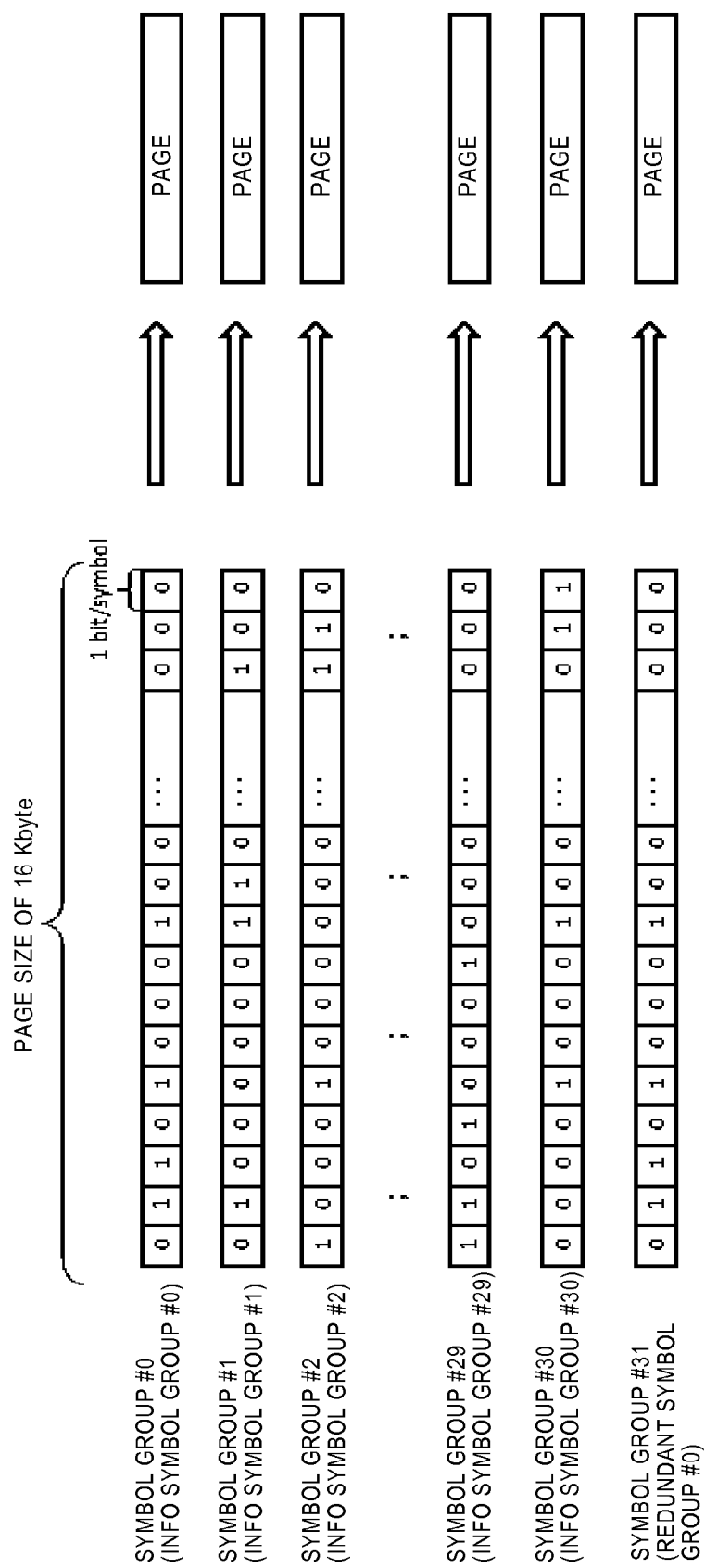

FIG. 5

| WL | PG | CODE | WRITE DATA SYMBOL GROUP |
|---|---|---|---|
| WL0 | 0 | | INFO #0 |
| | 1 | | INFO #1 |
| | 2 | | INFO #2 |
| WL1 | 3 | | INFO #3 |
| | 4 | | INFO #4 |
| | 5 | | INFO #5 |
| WL2 | 6 | CODE DATA #0 | INFO #6 |
| | 7 | | INFO #7 |
| | 8 | | INFO #8 |
| WL3 | 9 | | INFO #9 |
| | 10 | | INFO #10 |
| | 11 | | INFO #11 |
| WL4 | 12 | | INFO #12 |
| | 13 | | REDUNDANT #0 |
| | 14 | | REDUNDANT #1 |
| WL5 | 15 | | INFO #0 |
| | 16 | | INFO #1 |
| | 17 | | INFO #2 |
| WL6 | 18 | | INFO #3 |
| | 19 | | INFO #4 |
| | 20 | | INFO #5 |
| WL7 | 21 | CODE DATA #1 | INFO #6 |
| | 22 | | INFO #7 |
| | 23 | | INFO #8 |
| WL8 | 24 | | INFO #9 |
| | 25 | | INFO #10 |
| | 26 | | INFO #11 |
| WL9 | 27 | | INFO #12 |
| | 28 | | REDUNDANT #0 |
| | 29 | | REDUNDANT #1 |

\* INDICATES START TIMING OF ERROR CORRECTION CODING PROCESS ON EACH SYMBOL GROUP IN CODE ENCODING UNIT 23

| DATA TO BE STORED IN BUFFER | CALCULATION RESULT OF CODE DATA #0 | RESULTS OF CODE DATA #0 | CALCULATION RESULT OF CODE DATA #1 |
|---|---|---|---|

WRITING SEQUENCE: 1 2 3 4 5 6 7 8 9 10 11 12 13 14 15 16 17 18 19 20 21 22 23 24 25

FIG. 8

| WL | PG | WRITE DATA | |
|---|---|---|---|
| | | CODE DATA | SYMBOL GROUP |
| WL0 | 0 | #0 | INFO #0 |
| | 1 | #1 | INFO #1 |
| | 2 | #2 | INFO #2 |
| WL1 | 3 | #0 | INFO #3 |
| | 4 | #1 | INFO #4 |
| | 5 | #2 | INFO #5 |
| WL2 | 6 | #0 | INFO #6 |
| | 7 | #1 | INFO #7 |
| | 8 | #2 | INFO #8 |
| WL3 | 9 | #0 | INFO #9 |
| | 10 | #1 | INFO #10 |
| | 11 | #2 | INFO #11 |
| WL4 | 12 | #0 | INFO #12 |
| | 13 | #1 | REDUNDANT #0 |
| | 14 | #2 | REDUNDANT #1 |
| WL5 | 15 | #3 | INFO #0 |
| | 16 | #4 | INFO #1 |
| | 17 | #5 | INFO #2 |
| WL6 | 18 | #3 | INFO #3 |
| | 19 | #4 | INFO #4 |
| | 20 | #5 | INFO #5 |
| WL7 | 21 | #3 | INFO #6 |
| | 22 | #4 | INFO #7 |
| | 23 | #5 | INFO #8 |
| WL8 | 24 | #3 | INFO #9 |
| | 25 | #4 | INFO #10 |
| | 26 | #5 | INFO #11 |
| WL9 | 27 | #3 | INFO #12 |
| | 28 | #4 | REDUNDANT #0 |
| | 29 | #5 | REDUNDANT #1 |

\* INDICATES START TIMING OF ERROR CORRECTION CODING PROCESS ON EACH SYMBOL GROUP IN CODE ENCODING UNIT 23

| DATA TO BE STORED IN BUFFER | NONE | CALCULATION RESULTS OF CODE DATA #0, #1, #2 | RESULTS OF CODE DATA #3, #4, #5 |
|---|---|---|---|
| WRITING SEQUENCE | 1 2 3 4 5 6 7 8 9 10 11 12 13 14 15 16 17 18 19 20 21 22 23 24 25 |

| WRITE DATA | | DESTINATION | | WRITE DATA | | DESTINATION | | WRITE DATA | | DESTINATION | | WRITE DATA | | DESTINATION | |
|---|---|---|---|---|---|---|---|---|---|---|---|---|---|---|---|
| CODE DATA | INFORMATION SYMBOL GROUP | BL | WL | CODE DATA | INFORMATION SYMBOL GROUP | BL | WL | CODE DATA | INFORMATION SYMBOL GROUP | BL | WL | CODE DATA | INFORMATION SYMBOL GROUP | BL | WL |
| #0-#2 | INFO #0 | 0 | | #0-#2 | INFO #32 | 0 | | #0-#2 | INFO #64 | 0 | | #0-#2 | INFO #96 | 0 | |
| #0-#2 | INFO #1 | 1 | | #0-#2 | INFO #33 | 1 | | #0-#2 | INFO #65 | 1 | | #0-#2 | INFO #97 | 1 | |
| #0-#2 | INFO #2 | 2 | | #0-#2 | INFO #34 | 2 | | #0-#2 | INFO #66 | 2 | | #0-#2 | INFO #98 | 2 | |
| #0-#2 | INFO #3 | 3 | | #0-#2 | INFO #35 | 3 | | #0-#2 | INFO #67 | 3 | | #0-#2 | INFO #99 | 3 | |
| #0-#2 | INFO #4 | 4 | | #0-#2 | INFO #36 | 4 | | #0-#2 | INFO #68 | 4 | | #0-#2 | INFO #100 | 4 | |
| #0-#2 | INFO #5 | 5 | | #0-#2 | INFO #37 | 5 | | #0-#2 | INFO #69 | 5 | | #0-#2 | INFO #101 | 5 | |
| #0-#2 | INFO #6 | 6 | | #0-#2 | INFO #38 | 6 | | #0-#2 | INFO #70 | 6 | | #0-#2 | INFO #102 | 6 | |
| #0-#2 | INFO #7 | 7 | 0 | #0-#2 | INFO #39 | 7 | 2 | #0-#2 | INFO #71 | 7 | 4 | #0-#2 | INFO #103 | 7 | 6 |
| #0-#2 | INFO #8 | 8 | | #0-#2 | INFO #40 | 8 | | #0-#2 | INFO #72 | 8 | | #0-#2 | INFO #104 | 8 | |
| #0-#2 | INFO #9 | 9 | | #0-#2 | INFO #41 | 9 | | #0-#2 | INFO #73 | 9 | | #0-#2 | INFO #105 | 9 | |
| #0-#2 | INFO #10 | 10 | | #0-#2 | INFO #42 | 10 | | #0-#2 | INFO #74 | 10 | | #0-#2 | INFO #106 | 10 | |
| #0-#2 | INFO #11 | 11 | | #0-#2 | INFO #43 | 11 | | #0-#2 | INFO #75 | 11 | | #0-#2 | INFO #107 | 11 | |
| #0-#2 | INFO #12 | 12 | | #0-#2 | INFO #44 | 12 | | #0-#2 | INFO #76 | 12 | | #0-#2 | INFO #108 | 12 | |
| #0-#2 | INFO #13 | 13 | | #0-#2 | INFO #45 | 13 | | #0-#2 | INFO #77 | 13 | | #0-#2 | INFO #109 | 13 | |
| #0-#2 | INFO #14 | 14 | | #0-#2 | INFO #46 | 14 | | #0-#2 | INFO #78 | 14 | | #0-#2 | INFO #110 | 14 | |
| #0-#2 | INFO #15 | 15 | | #0-#2 | INFO #47 | 15 | | #0-#2 | INFO #79 | 15 | | #0-#2 | INFO #111 | 15 | |
| #0-#2 | INFO #16 | 0 | | #0-#2 | INFO #48 | 0 | | #0-#2 | INFO #80 | 0 | | #0-#2 | INFO #112 | 0 | |
| #0-#2 | INFO #17 | 1 | | #0-#2 | INFO #49 | 1 | | #0-#2 | INFO #81 | 1 | | #0-#2 | INFO #113 | 1 | |
| #0-#2 | INFO #18 | 2 | | #0-#2 | INFO #50 | 2 | | #0-#2 | INFO #82 | 2 | | #0-#2 | INFO #114 | 2 | |
| #0-#2 | INFO #19 | 3 | | #0-#2 | INFO #51 | 3 | | #0-#2 | INFO #83 | 3 | | #0-#2 | INFO #115 | 3 | |
| #0-#2 | INFO #20 | 4 | | #0-#2 | INFO #52 | 4 | | #0-#2 | INFO #84 | 4 | | #0-#2 | INFO #116 | 4 | |
| #0-#2 | INFO #21 | 5 | | #0-#2 | INFO #53 | 5 | | #0-#2 | INFO #85 | 5 | | #0-#2 | INFO #117 | 5 | |
| #0-#2 | INFO #22 | 6 | | #0-#2 | INFO #54 | 6 | | #0-#2 | INFO #86 | 6 | | #0-#2 | INFO #118 | 6 | |
| #0-#2 | INFO #23 | 7 | 1 | #0-#2 | INFO #55 | 7 | 3 | #0-#2 | INFO #87 | 7 | 5 | #0-#2 | INFO #119 | 7 | 7 |
| #0-#2 | INFO #24 | 8 | | #0-#2 | INFO #56 | 8 | | #0-#2 | INFO #88 | 8 | | #0-#2 | INFO #120 | 8 | |
| #0-#2 | INFO #25 | 9 | | #0-#2 | INFO #57 | 9 | | #0-#2 | INFO #89 | 9 | | #0-#2 | INFO #121 | 9 | |
| #0-#2 | INFO #26 | 10 | | #0-#2 | INFO #58 | 10 | | #0-#2 | INFO #90 | 10 | | #0-#2 | INFO #122 | 10 | |
| #0-#2 | INFO #27 | 11 | | #0-#2 | INFO #59 | 11 | | #0-#2 | INFO #91 | 11 | | #0-#2 | INFO #123 | 11 | |
| #0-#2 | INFO #28 | 12 | | #0-#2 | INFO #60 | 12 | | #0-#2 | INFO #92 | 12 | | #0-#2 | INFO #124 | 12 | |
| #0-#2 | INFO #29 | 13 | | #0-#2 | INFO #61 | 13 | | #0-#2 | INFO #93 | 13 | | #0-#2 | INFO #125 | 13 | |
| #0-#2 | INFO #30 | 14 | | #0-#2 | INFO #62 | 14 | | #0-#2 | INFO #94 | 14 | | #0-#2 | REDUNDANT #0 | 14 | |
| #0-#2 | INFO #31 | 15 | | #0-#2 | INFO #63 | 15 | | #0-#2 | INFO #95 | 15 | | #0-#2 | REDUNDANT #1 | 15 | |

MEMORY SYSTEM

CROSS-REFERENCE TO RELATED APPLICATION

This application is based upon and claims the benefit of priority from Japanese Patent Application No. 2013-000939, filed Jan. 8, 2013, the entire contents of which are incorporated herein by reference.

FIELD

Embodiments described herein relate generally to a memory system.

BACKGROUND

In writing data in a multi-value storage type flash memory that stores data of two or more bits in each memory cell, there is a problem such as interference (hereinafter, referred to as a proximity effect) between memory cells. As a countermeasure against this problem, writing data in a memory cell is performed through two or more stages. More particularly, writing data in a memory cell group connected to a word line (hereinafter referred to as a WL) is performed through a plurality of stages, and is performed in a sequence in which the first writing stage is performed with respect to a k-th WL and then a k+1-th WL, and the second writing stage is performed with respect to the k-th WL.

When an error correction code (ECC) is calculated based on data to be written into memory cells using such a writing sequence, there are times at which n error correction codes are being calculated for data being written into memory cells connected to different WLs. In order to accommodate this situation, a random access memory (RAM) or a buffer with a size capable of simultaneously storing both ECC calculation results are necessary.

DESCRIPTION OF THE DRAWINGS

FIG. 3 illustrates an example of an error correction code generated in the memory system according to the first embodiment.

FIG. 4 illustrates another example of an error correction code generated in the memory system according to the first embodiment.

FIG. 5 illustrates a writing sequence of a symbol group of two code data units in a memory system according to the related art.

FIG. 8 illustrates a writing sequence of symbol groups of three code data units that share one WL, performed in a memory system according to a second embodiment.

FIG. 10 illustrates a writing sequence of symbol groups of three code data units that share one WL in the memory system according to the third embodiment.

FIG. 11 illustrates an example of a relationship between a writing destination and symbol groups when the symbol groups are included in three code data units that share one WL in each of blocks of a NAND memory, in the memory system according to the third embodiment.

DETAILED DESCRIPTION

According to an embodiment, a memory system capable of calculating an error correction data with a smaller calculation result storage region is provided.

In general, according to one embodiment, a memory device includes a memory unit including a first subunit and a second subunit, a code encoding unit configured to calculate first redundant data based on first write data and second redundant data based on second write data, and a control unit configured to cause the first write data and the first redundant data to be written in the first subunit and the second write data and the second redundant data to be written in the second subunit. The first and second write data and the first and second redundant data are written through a plurality of writing steps, in each of which a part of data is written, at least one of the writing steps for writing the second write data and the second redundant data being carried out before all of the writing steps for writing the first write data and the first redundant data have been carried out. The control unit is configured to control the code encoding unit to start calculation of the second redundant data after all of the writing steps for writing the first write data and the first redundant data have been carried out.

Hereinafter, embodiments will be described with reference to the drawings.

First Embodiment

Figure 1:
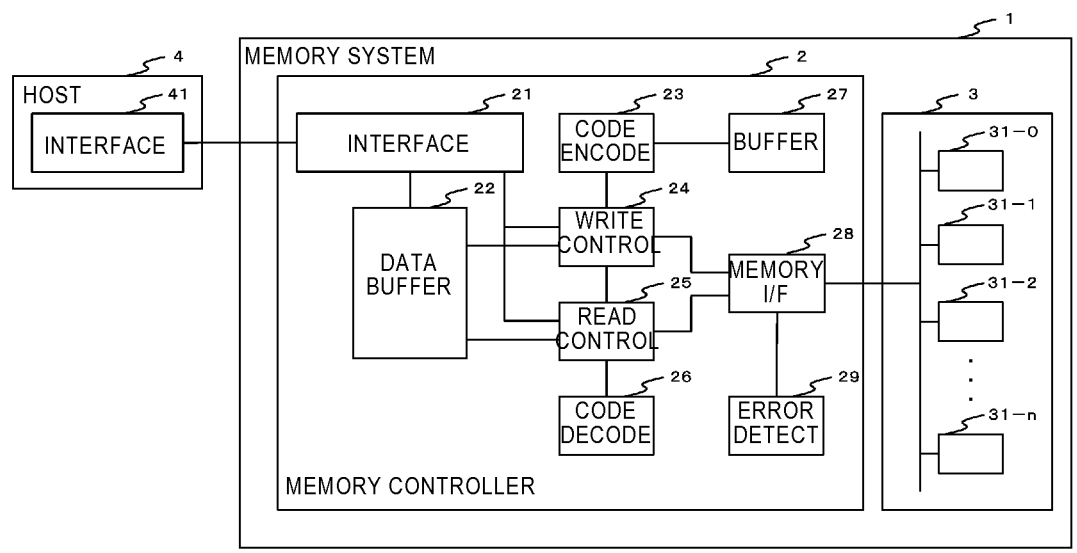
FIG. 1 is a block diagram illustrating an example of a memory system according to a first embodiment.

FIG. 1 is a block diagram illustrating an example of a memory system 1 according to a first embodiment. The memory system 1 includes a memory controller 2 and a NAND memory 3. The memory system 1 can be connected to a host 4. In FIG. 1, the memory system 1 is connected to the host 4. The host 4 is, for example, an electronic apparatus such as a personal computer or a portable terminal.

The NAND memory 3 is a non-volatile memory that stores data in a non-volatile manner and includes n+1 (where n is an integer equal to or greater than 0) memory chips (memories) 31-0 to 31-$n$. The memory 31-$k$ represents a k-th memory chip. Here, an example of the NAND memory 3 used as the non-volatile memory will be described. However, a storage unit other than the NAND memory may be used.

The memory controller 2 controls writing on the NAND memory 3 according to a writing command from the host 4 and controls reading from the NAND memory 3 according to a reading command from the host 4. The memory controller 2 includes an interface unit 21, a data buffer 22, a code encoding unit 23, a writing control unit 24, a reading control unit 25, a code decoding unit 26, a calculation result storage buffer 27, a memory interface (I/F) 28, and a read error detection unit 29.

The interface unit 21 is connected to the interface unit 41 of the host 4 via a communication line and performs a transmission process or the like between the host 4 and the memory system 1 according to a class or standard of the communication line. Examples of the communication line include a serial bus such as serial advanced technology attachment (SATA), an address bus, and a data bus. The interface unit 21 receives a reading command, a writing command, or the like from the host 4 and receives an address or a size of data to be transmitted according to the command. Thereafter, a necessary buffer region is ensured on the data buffer 22, and the writing control unit 24 or the reading control unit 25 is notified of a process of each command. The interface unit 21 receives write data to be written in the NAND memory 3 from the host 4 and stores the write data in the data buffer 22. The interface unit 21 transmits read data read from the NAND memory 3 and stored in the data buffer 22 to the host 4.

The data buffer 22 is a memory that is used to temporarily store data received from the host 4 by the memory controller 2 until the data is stored in the NAND memory 3 or to temporarily store data read from the NAND memory 3 until the data is transmitted to the host 4. For example, the data buffer 22 is configured as a general-purpose memory such as a static random access memory (SRAM) or a dynamic random access memory (DRAM).

The writing control unit 24 controls a process of writing the write data stored in the data buffer 22 on the NAND memory 3. Specifically, the writing control unit 24 determines a region of the NAND memory 3 in which the data stored in the data buffer 22 is to be written, reads and transmits the data to the code encoding unit 23 from the data buffer 22, determines a region of the NAND memory 3 in which a redundant portion of a code generated by the code encoding unit 23 is to be written, and transmits the data and the redundant portion to the memory I/F 28. When the transmission of the write data to the memory I/F 28 ends, the writing control unit 24 releases clear a region of the data buffer 22 in which the write data is stored.

Based on the data transmitted from the writing control unit 24, the code encoding unit 23 generates a redundant symbol for error correction by performing an error correction coding process. Any code can be used as the error correction code. For example, a Reed-Solomon (RS) code or an XOR parity code can be used. A kind of error correction code is not limited. However, a systematic code capable of clearly dividing an information symbol from a redundant symbol after encoding is preferable for the error correction code. That is, one error correction code includes an information symbol and a redundant symbol. The information symbol is data serving as a source of the error correction code, and the redundant symbol is a portion generated and added through the error correction coding process. When the coding is performed, a calculation result is stored in the calculation result storage buffer 27 and the redundant symbol is generated based on the stored data and the data transmitted from the writing control unit 24. In the embodiment, the symbols included in one error correction code are disposed so as to be recorded in different writing units in the NAND memory 3. Since a unit data size written by one writing process in a memory is generally considerably greater than a number of bits per one symbol of the error correction code, a unit data size per one writing process corresponds to a symbol group including a plurality of symbols.

As a writing error, not only is there a random error that occurs by a bit unit, but there is a burst error that occurs by a page unit when a peripheral circuit is broken down in a WL unit. When an error occurs in the page unit and one error correction code is generated based on an information symbol group in a same page, even one information symbol group based on the source of the code may not be read in spite of the fact that the redundant symbol can be read from the NAND memory 3, and thus decoding may not be performed. Therefore, the symbol group configured to generate one error correction code is preferably distributed and stored in different pages of the NAND memory 3. Examples of the error correction code when a symbol group configured to generate one error correction code is distributed and stored in different pages will be described below with reference to FIGS. 3 and 4.

The calculation result storage buffer 27 is a buffer that stores a calculation result of the error correction coding process performed by the code encoding unit 23. For example, a general-purpose memory such as a static random access memory (SRAM) or a dynamic random access memory (DRAM) is used for the code encoding unit 23. The calculation result storage buffer 27 may be included in a part of the data buffer 22.

The memory I/F 28 is a controller that directly controls writing of the write data in or reading of the read data from the NAND memory 3. The memory I/F 28 transmits the write data transmitted from the writing control unit 24 to the NAND memory 3 and gives an instruction to write the write data in a writing region determined by the writing control unit 24. The memory I/F 28 reads the data instructed to be read by the reading control unit 25 from the NAND memory 3 and transmits the data to the reading control unit 25. The memory I/F 28 receives a status signal or the like from the NAND memory 3.

When the memory I/F 28 reads data from the NAND memory 3, the read error detection unit 29 detects whether the reading fails or succeeds, that is, whether there is a reading error, and notifies the memory I/F 28 of the detection result. Whether the reading fails or succeeds may be determined based on any method. For example, whether the reading fails or succeeds may be determined based on a status signal or the like output from the NAND memory 3. Alternatively, the reading may be determined to fail, when an error is detected through an error detection process using the error detection code after the data is stored in the NAND memory 3 with an error detection code at the time of the writing.

The reading control unit 25 controls a process of read data (reading target data) requested to be read from the NAND memory 3 according to a reading command notified via the interface unit 21 and transmitted from the host 4. Specifically, the reading control unit 25 instructs the memory I/F 28 to read the data requested to be read from the NAND memory 3 and allocates a region of the data buffer 22 in which the read data is to be stored. When the read error detection unit 29 does not detect an error, the reading control unit 25 stores the read data in the allocated region of the data buffer 22. Conversely, when the read error detection unit 29 detects an error, the reading control unit 25 instructs the memory I/F 28 to identify and read storage positions of the NAND memory 3 with respect to all of the symbols included in the error correction code corresponding to the data in which the error is detected. Then, the reading control unit 25 transmits the read symbols to the code decoding unit 26 and gives an instruction to perform an error correction process. Thereafter, the data on which the error correction process is performed is transmitted to the region of the data buffer 22 which is allocated to the read data.

The code decoding unit 26 performs a decoding process based on the data transmitted from the reading control unit 25 and transmits the read data on which the error correction is performed to the reading control unit 25.

Figure 2:
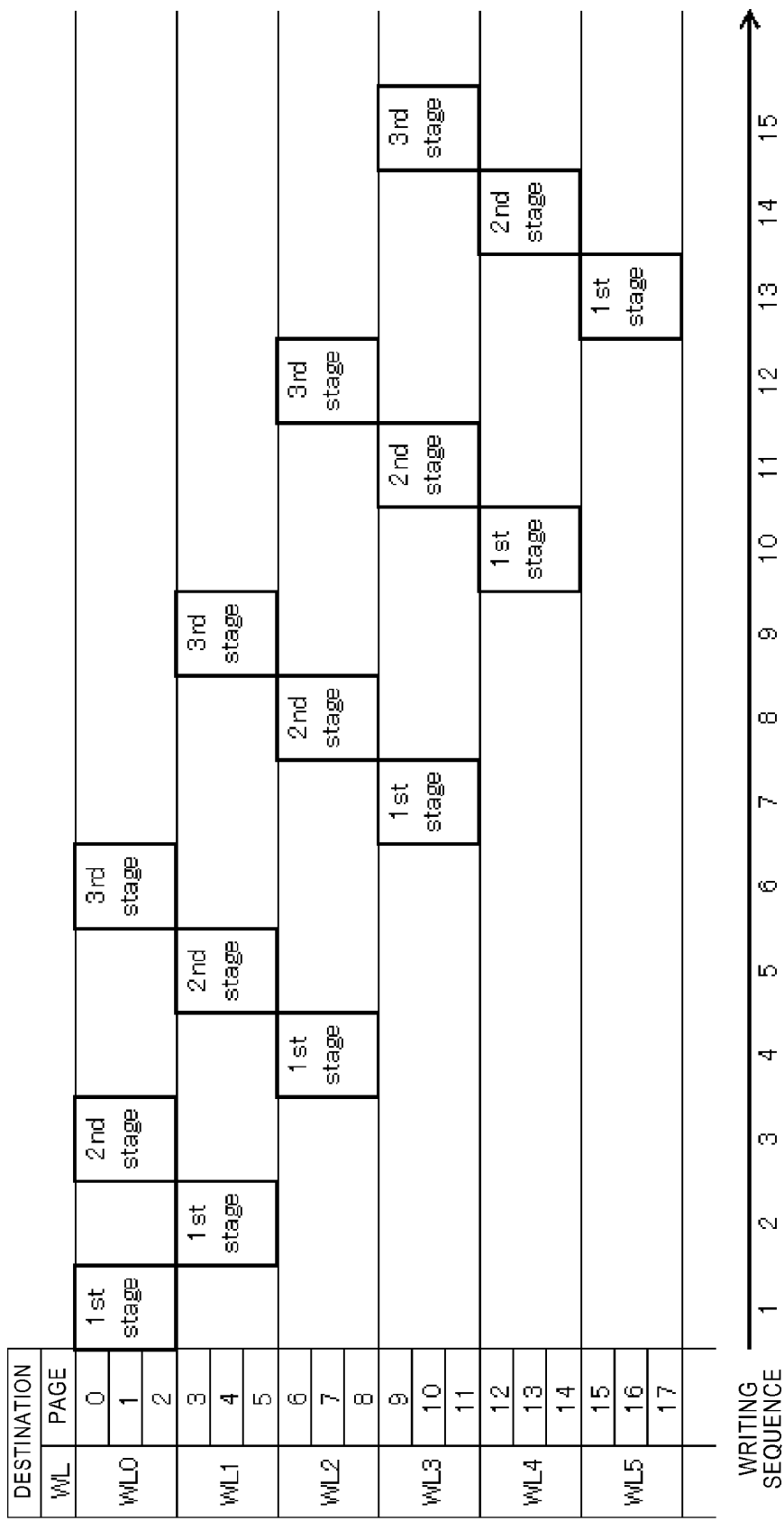
FIG. 2 illustrates a sequence of writing in which first to third writing stages are performed with respect to each word line.

FIG. 2 illustrates a sequence of writing in which first to third writing stages are performed with respect to each word line. Here, 3-bit data can be stored in each memory cell. In the FIG. 2, "1" to "15" of a writing sequence indicate a sequence of the first, second, and third writing stages.

First, the first writing stage is performed on WL0. That is, the writing control unit 24 transmits the write data to be written in memory cells along WL0 to the memory I/F 28, and then the memory I/F 28 transmits the write data transmitted from the writing control unit 24 to the NAND memory 3 and gives an instruction to write the write data in memory cells along WL0.

In the subsequent writing, the first writing stage is performed on WL1. That is, the writing control unit 24 transmits the write data to be written in memory cells along WL1 to the memory I/F 28, and then the memory I/F 28 transmits the write data transmitted from the writing control unit 24 to the NAND memory 3 and gives an instruction to write the write data in memory cells along WL1.

In the subsequent writing, the second writing stage is performed on WL0. That is, the writing control unit 24 transmits the write data to be written in memory cells along WL0 to the memory I/F 28, and then the memory I/F 28 transmits the write data transmitted from the writing control unit 24 to the NAND memory 3 and gives an instruction to write the write data in memory cells along WL0.

In the subsequent writing, the first writing stage is performed on WL2. That is, the writing control unit 24 transmits the write data to be written in memory cells along WL2 to the memory I/F 28, and then the memory I/F 28 transmits the write data transmitted from the writing control unit 24 to the NAND memory 3 and gives an instruction to write the write data in memory cells along WL2.

In the subsequent writing, the second writing stage is performed on WL1. That is, the writing control unit 24 transmits the write data to be written in memory cells along WL1 to the memory I/F 28, and then the memory I/F 28 transmits the write data transmitted from the writing control unit 24 to the NAND memory 3 and gives an instruction to write the write data in memory cells along WL1.

The writing continues in the above-described sequence to perform the first to third writing stages on each WL. In each writing stage, data corresponding to 3 pages is written. Thus, the proximity effect can be reduced by sequentially performing the first to third writing stages by changing WLs.

FIGS. 3 and 4 illustrate examples of the error correction codes generated in the memory system according to the embodiment. FIG. 3 illustrates an example in which an RS code is used, and FIG. 4 illustrates an example in which an XOR parity is used. In the example in which the RS code in FIG. 3 is used, 1 symbol is set to have 8 bits. In the example in which the XOR parity in FIG. 4 is used, 1 symbol is set to have 1 bit. The size of each symbol group is set to be 16 kbytes, which is a data size corresponding to 1 page. Here, 1 symbol is set to 1 bit or 8 bits, and 1 page is set to 16 kbytes. However, the number of bits included in 1 symbol and the data size of 1 page are not limited thereto.

In the example of FIG. 3, 30 symbol groups of symbol group #0 to symbol group #29 are set to information symbol groups #0 to #29, respectively, and symbol group #30 and symbol group #31 are set to redundant symbol groups #0 and #1, respectively.

In FIG. 3, 32 symbols, each of which is included in symbol group #0 to symbol group #31, indicated by an RS code 301 are symbols corresponding to one RS code. Redundant symbols (a total of 2 symbols), each of which is included in redundant symbols #30 and 31, respectively, in the RS code 301 are generated based on symbols (a total of 30 symbols) included in the information symbol groups #0 to #29 in the RS code 301. As symbol groups #0 to #31 are each written on different pages, the 32 symbols corresponding to one RS code are stored in different pages, respectively.

In the example of FIG. 4, 31 symbol groups of symbol group #0 to symbol group #30 are set to information symbol groups #0 to #30, respectively, and symbol group #31 is set to redundant symbol group #0. One redundant symbol of redundant symbol group #0 is generated based on symbols (a total of 31 symbols) included in information symbol groups #0 to #30. As symbol groups #0 to #31 are each written in different pages, the symbols corresponding to one parity code, each of which is included in symbol group #0 to symbol group #31, are stored in different pages.

The above-described configurations of the error correction codes are merely examples. The kinds of error correction codes, a ratio of the information symbols to the redundant symbols, and the like are not limited to the examples of FIGS. 3 and 4.

Hereinafter, it is assumed that n is a total number of information symbols and redundant symbols included in one error correction code and k is the number of information symbols. N symbol groups (the information symbol groups and the redundant symbol groups corresponding thereto) are referred to as a code data unit. In the example of FIG. 3, n=32 and k=30, 32 symbol groups form one code data unit, and 30 symbol groups of the 32 symbol groups are information symbol groups. In the example of FIG. 4, n=32 and k=31.

FIG. 5 illustrates a writing sequence of symbol groups of two code data units in a memory system according to the related art. As in FIG. 2, writing of data corresponding to 3 pages on each WL is performed through first to third writing stages. In the example of FIG. 5, n=15 and k=13, 15 symbol groups form one code data unit, 13 symbol groups of the 15 symbol groups are information symbol groups, and 2 symbol groups are redundant symbol groups. When data of the code data unit formed of the 15 symbol groups are assumed to be code data #0 and code data #1, code data #0 and code data #1 are written without sharing the WLs.

In a process (code encoding process) of generating an error correction code in the code encoding unit 23, the error correction code may be calculated using a calculation result with respect the previous number of symbols, as the number of symbols to be input in the calculation increases. That is, when it is assumed that Eq is an error correction code obtained using symbols of x(0), x(1), . . . , and x(q−1), an error correction code using symbols of x(0), x(1), . . . , and x(q) can be generated based on Eq and x(q). When an error correction code generated based on k information symbols is generated as a final error correction code to be stored in the NAND memory 3, an error correction code (for example, Eq described above) generated based on symbols less than k information symbols by the code encoding unit 23 is an intermediate calculation result and is stored in the calculation result storage buffer 27.

As shown in writing sequence 13 to writing sequence 18 in FIG. 5, there are timings at which symbol groups included in code data #0 and symbol groups included in code #1 are alternately written on the WLs, when write data to be written on the WLs is switched from code data #0 to code data #1. Calculation of the error correction coding process with respect to code data #1 starts in writing sequence 13 in FIG. 5. On the other hand, a region for storing the calculation result of the error correction coding process with respect to code data #0 is cleared from the calculation result storage buffer 27, after the third writing stage of the redundant symbol group of the code data #0 on the WL ends in writing sequence 18. Therefore, at the timings (between the writing sequences 13 and 18), it is necessary to store both calculation results of code data #0 and code data #1 in the calculation result storage buffer 27.

Since the number of redundant symbol groups is 2, "16 kbytes×2 symbols=32 kbytes" is necessary to store the calculation result of code data #0 and code data #1, respectively. In order to store both calculation results of code data #0 and code data #1, "32 kbytes×2=64 kbytes" is necessary. Therefore, 64 kbytes is necessary to store the calculation results of the error correction coding process.

Thus, in the writing process of the NAND memory in the memory system according to the related art, there are the timings at which the symbol groups of respective code data types are alternately written on the WLs when the code data types written on the WLs are switched. Therefore, when the calculation of the error correction coding process is alternately performed as well at the timings, it is necessary to store the calculation results of the error correction coding process for both code data types in the calculation result storage buffer 27.

In the memory system according to the embodiment, however, by changing the calculation sequences of the error correction coding process, only the calculation result of the error correction coding process with respect to one of the code data types is stored in the calculation result storage buffer 27, even at the timings at which the symbol groups of the respective code data types are alternately written on the WLs by switching the code data type written to the WLs. Therefore, it is possible to suppress an increase in the storage region of the calculation result.

Figure 6:
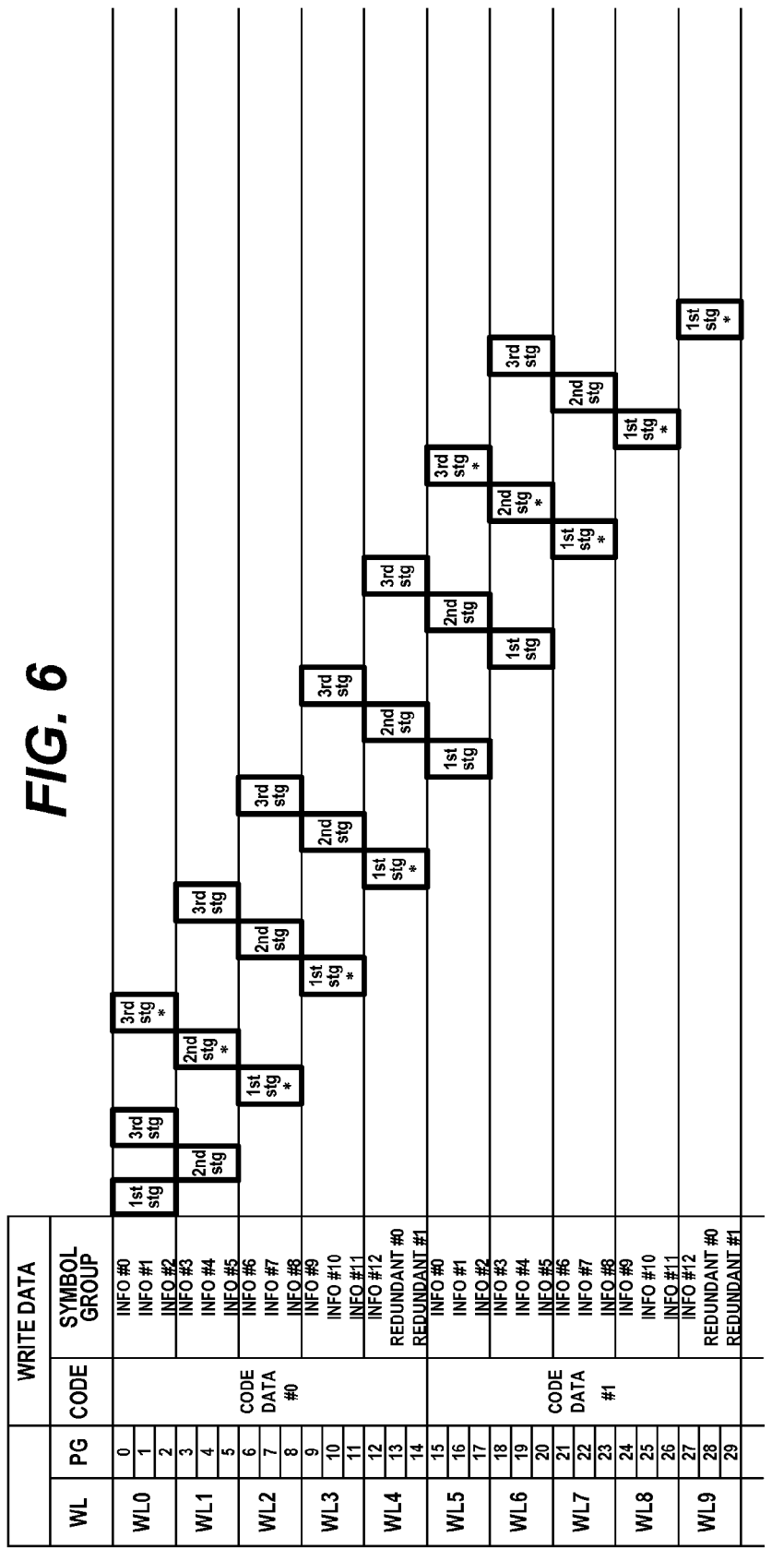
FIG. 6 illustrates a writing sequence of a symbol group of two code data units in the memory system according to the first embodiment.

FIG. 6 illustrates a writing sequence of the symbol groups of 2 code data units performed in the memory system according to the embodiment. As in FIG. 5, 15 symbol groups form one code data unit, 13 symbol groups of the 15 symbol groups are information symbol groups, and 2 symbol groups are redundant symbol groups. The writing of data corresponding to 3 pages on each WL is performed through the first to third writing stages. When each of the encoding data unit formed of 15 symbol groups is set to be code data #0 and code data #1, the writing is performed on code data #0 and code data #1 without sharing the WLs. Unlike the writing sequence 13 in FIG. 5, in writing sequence 13 in FIG. 6, the calculation of the error correction coding process of code data #1 does not start. In writing sequence 18, after the third writing stage on the WL of the redundant symbol groups of code data #0 ends, the region for storing the calculation result of the error correction coding process with respect to code data #0 is cleared from the calculation result storage buffer 27. In writing sequence 19, the region for the storage of the calculation result of the error correction coding process with respect to code data #1 is ensured in the calculation result storage buffer 27 and the calculation of the error correction coding process with respect to code data #1 starts. During or before writing sequence 25 which is the first writing stage of the redundant symbol groups, the calculation of the error correction coding process with respect code data #1 is ended. That is, with respect to the first WL of code data #1 (i.e., WL5), the calculation of the error correction coding process starts during the third writing stage. With respect to the other WLs of code data #1, the calculation of the error correction coding process is performed before the first writing stage of the final WL starts. In this case, only one of the calculation results of the error correction coding process of code data #0 and code data #1 needs to be stored in the calculation result storage buffer 27, and therefore a necessary area is 32 kbytes.

Figure 7:
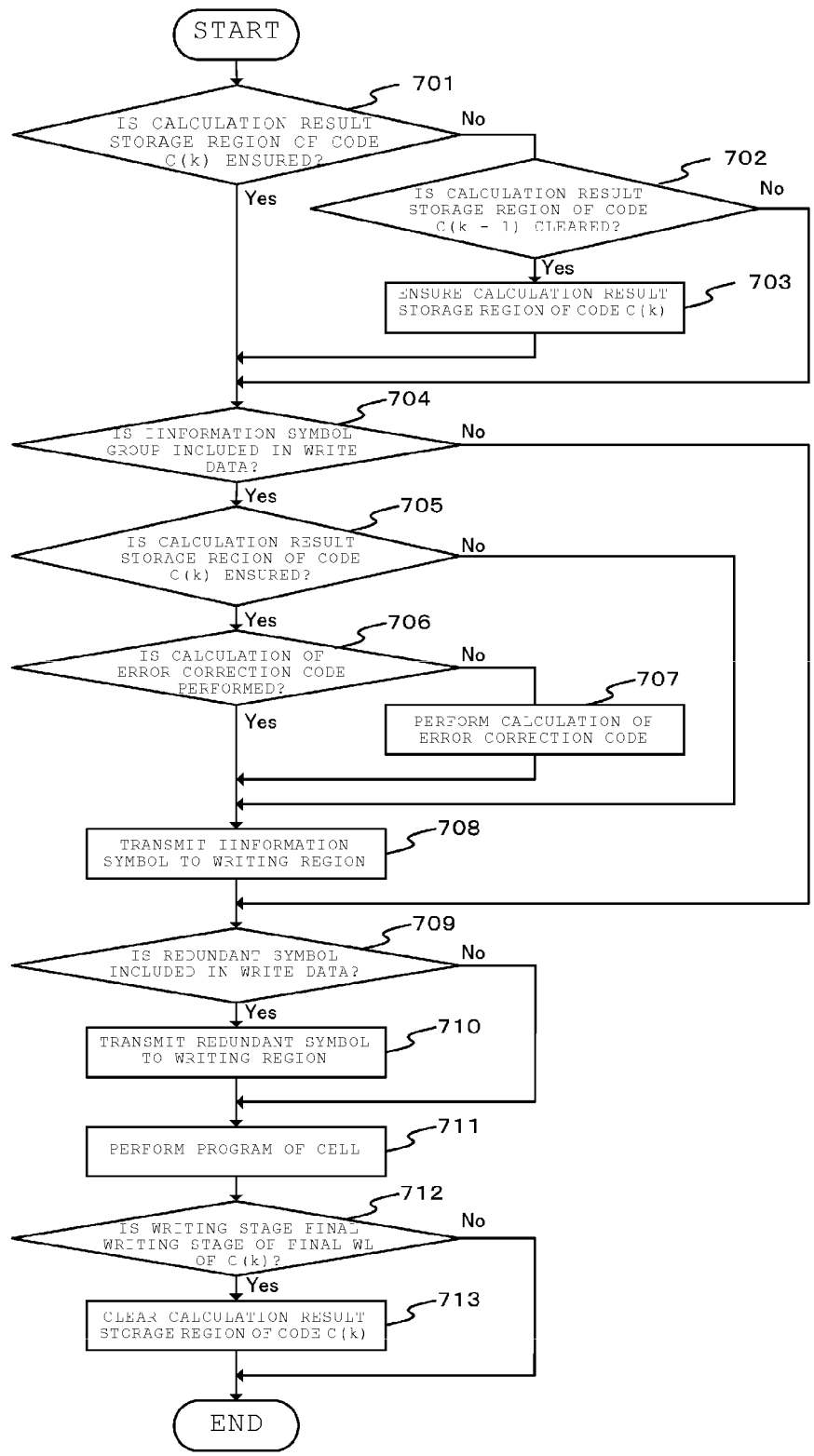
FIG. 7 is a flowchart illustrating an example of a processing sequence of respective writing stages when writing data in each of the memory cell groups corresponding to each word line is performed through a plurality of stages in the memory system according to the first embodiment.

FIG. 7 is a flowchart illustrating an example of a processing sequence of respective writing stages when the writing of data on the memory cell group connected to each word line is performed through a plurality of stages in the memory system according to the embodiment.

The memory controller 2 determines whether a region for storing the calculation result of the error correction coding process with respect to the code data C(k) (hereinafter referred to as a region for code data C(k)) is ensured in the calculation result storage buffer 27 (step 701). Here, k of the code data C(k) is a number used to identify the code data. Code data #0 corresponds to code data C(0), and code data #1 corresponds to code data C(1). When the region for the code data C(k) is not ensured in the calculation result storage buffer 27 (No in step 701), the memory controller 2 determines whether or not a region for storing the calculation result of the error correction coding process with respect to code data C(k−1) (hereinafter, referred to as a region for code data C(k−1)) is cleared from the calculation result storage buffer 27 (step 702). When the region is cleared (Yes in step 702), memory controller 2 ensures the region for the code data C(k) in the calculation result storage buffer 27 (step 703). When the region for the code data C(k) is ensured in the calculation result storage buffer 27 (Yes in step 701) or when the region for the code data C(k) is not ensured in the calculation result storage buffer 27 (No in step 701) and the region for the code data C(k−1) is not released from the calculation result storage buffer 27 (No in step 702), the process proceeds to step (step 704) to determine whether or not an information symbol group is included in the write data.

Next, the memory controller 2 determines whether the information symbol group is included in the write data (step 704). When the information symbol group is not included in the write data (No in step 704), the process proceeds to step (step 709) to determine whether or not the redundant symbol group is included in the write data. When the information symbol group is included in the write data (Yes in step 704), memory controller 2 determines whether the region for the code data C(k) is ensured in the calculation result storage buffer 27 (step 705). When the region for the code data C(k) is ensured (Yes in step 705), memory controller 2 determines whether or not the calculation of the error correction coding process based on data of the information symbol group to be written is performed (step 706). When the calculation of the error correction coding process is not performed (No in step 706), memory controller 2 transmits data of the information symbol group to be written to the code encoding unit 23, and then the code encoding unit 23 performs the calculation of the error correction coding process based on the information symbol group (step 707). When the region for storing the calculation result is ensured in the calculation result storage buffer 27 (Yes in step 705) and the calculation of the error correction coding process based on the data of the information symbol group to be written is performed (Yes in step 706), memory controller 2 transmits the data of the information symbol group to the memory I/F 28 (step 708) and gives an instruction to write the data of the information symbol group in the writing region of the NAND memory 3. Further, when the region for the code data C(k) is not ensured in the calculation result storage buffer 27 (No in step 705), memory controller 2 transmits the data of the information symbol group to the memory I/F 28 (step 708) and gives an instruction to write the data of the information symbol group in the writing region of the NAND memory 3.

Next, the memory controller 2 determines whether the redundant symbol group is included in the write data (step 709). When the redundant symbol group is not included (No in step 709), writing (program) in the memory cell group of the symbol group transmitted from the memory I/F 28 is performed in the NAND memory 3 (step 711).

When the redundant symbol group is included in the write data (Yes in step 709), the memory controller 2 transmits data of the redundant symbol group to the memory I/F 28 (step 710) and gives an instruction to write the data of the redundant symbol group in the writing region of the NAND memory 3. Thereafter, the writing (program) in the memory cell group of the symbol group transmitted from the memory I/F 28 is performed in the NAND memory 3 (step 711).

Next, the memory controller 2 determines whether or not the current writing stage is the final writing stage of the final WL of the code data C(k) (step 712). When the current writing stage is not the final writing stage (No in step 712), the process of the current writing stage ends. When this current writing stage is the final writing stage (Yes in step 712), the region for storing the calculation result of the code data C (k) is cleared (step 713) and the process of this current writing stage ends.

In the first embodiment, as described above, the memory controller 2 performs the calculation of the error correction coding process on the data of the symbol group written on the first WL in the final writing stage, performs the calculation of the error correction coding process on the data of the symbol group written on the final WL in the first writing stage, and performs the calculation on the data of the symbol group written on the other WLs before the start of the first writing stage on the final WL. The regions ensured in the calculation result storage buffer 27 to store the calculation result of the error correction coding process can be suppressed to a region necessary for the calculation of the error correction coding process in one code data unit.

Second Embodiment

FIG. 8 illustrates a writing sequence of symbol groups of three code data units that share one WL performed in a memory system according to a second embodiment. The configuration of the memory system according to the second embodiment is the same as the configuration of the memory system 1 illustrated in FIG. 1 according to the first embodiment.

In an example of FIG. 8, n=5, k=4, 5 symbol groups form one code data unit, 4 symbol groups of the 5 symbol groups are information symbol groups, and one symbol group is a redundant symbol group. Writing of data corresponding to 3 pages on each WL is performed through first to third writing stages. When data of the code data units, each of which is formed of 5 symbol groups, is assumed to be code data #0, code data #1, code data #2, code data #3, code data #4, and code data #5, the symbol groups included in code data #0, code data #1, and code data #2 are written with one shared WL and symbol groups included in code data #3, code data #4, and code data #5 are written with one shared WL.

In the example of FIG. 8, first, the first writing stage of symbol groups #0 of code data #0, code data #1, and code data #2 is performed commonly on WL0. Next, the first writing stage of symbol groups #1 of code data #0, code data #1, and code data #2 is performed commonly on WL1. Next, the second writing stage of symbol groups #0 of code data #0, code data #1, and code data #2 is performed commonly on WL0. Next, the first writing stage of symbol groups #2 of code data #0, code data #1, and code data #2 is performed commonly on WL2. Next, the second writing stage of symbol groups #1 of code data #0, code data #1, and code data #2 is performed commonly on WL1. Next, the third writing stage of symbol groups #0 of code data #0, code data #1, and code data #2 is performed commonly on WL0. By continuing the writing in the above-described way, the first to third writing stages are performed on each WL. Thus, the proximity effect can be reduced by sequentially performing the first to third writing stages while changing the WLs.

Since the number of redundant symbols per code data unit is one and the number of code data units sharing the WL is three, an area necessary to store the calculation result of the error correction coding process is 48 kbytes obtained by multiplying 16 kbytes, which is the size of one symbol group, by three, which is the number of code data units sharing one WL.

In writing sequence 13 of FIG. 8, the error correction coding process with respect to code data #3, code data #4, and code data #5 does not start. In writing sequence 18, after the third writing stage of the redundant symbol groups with respect to code data #0, code data #1, and code data #2 on the WL ends, the region for storing the calculation result of the error correction coding process with respect to code data #0, code data #1, and code data #2 is cleared from the calculation result storage buffer 27. In writing sequence 19, a region of the calculation result storage buffer 27 is ensured to store the calculation result of the error correction coding process with respect to code data #3, code data #4, and code data #5, and the calculation of the error correction coding process starts. Thereafter, during or before the first writing stage of the redundant symbol group in writing sequence 25, the calculation of the error correction coding process with respect to code data #3, code data #4, and code data #5 is ended. In this case, only one of the calculation result of the error correction coding process with respect to code data #0, code data #1, and code data #2 and the calculation result of the error correction coding process with respect to code data #3, code data #4, and code data #5 may be stored in the calculation result storage buffer 27. A necessary area is 48 kbytes.

In the memory system according to the embodiment, the flowchart of FIG. 7 is also applicable as an example of the processing sequence of each writing stage. As in the memory system according to the embodiment, when the symbol groups included in three code data units share one WL and are written, data of the three code data units sharing the writing on the WL corresponds to C(k). For example, in the case of FIG. 8, since the symbol groups of code data #0, code data #1, and code data #2 are written commonly through one WL and symbol groups of code data #3, code data #4, and code data #5 are written commonly through one WL, the flowchart of FIG. 7 is applicable by setting a collection of code data #0, code data #1, and code data #2 to code data C(0) and setting a collection of code data #3, code data #4, and code data #5 to code data C(1).

In the above-described second embodiment, even when the symbol groups included in a plurality of code data units are written commonly through one WL, the memory controller 2 performs the calculation of the error correction coding process on the data of the symbol groups written on the first WL in the final writing stage, performs the calculation of the error correction coding process on the data of the symbol groups written on the final WL in the first writing stage, and performs the calculation on the data of the symbol groups written on the other WLs before start of the first writing stage on the final WL. The regions ensured in the calculation result storage buffer 27 to store the calculation result of the error correction coding process can be suppressed to a region necessary for the calculation of the error correction coding process on the code data unit in which the WL is shared and the data is written.

Third Embodiment

Figure 9:
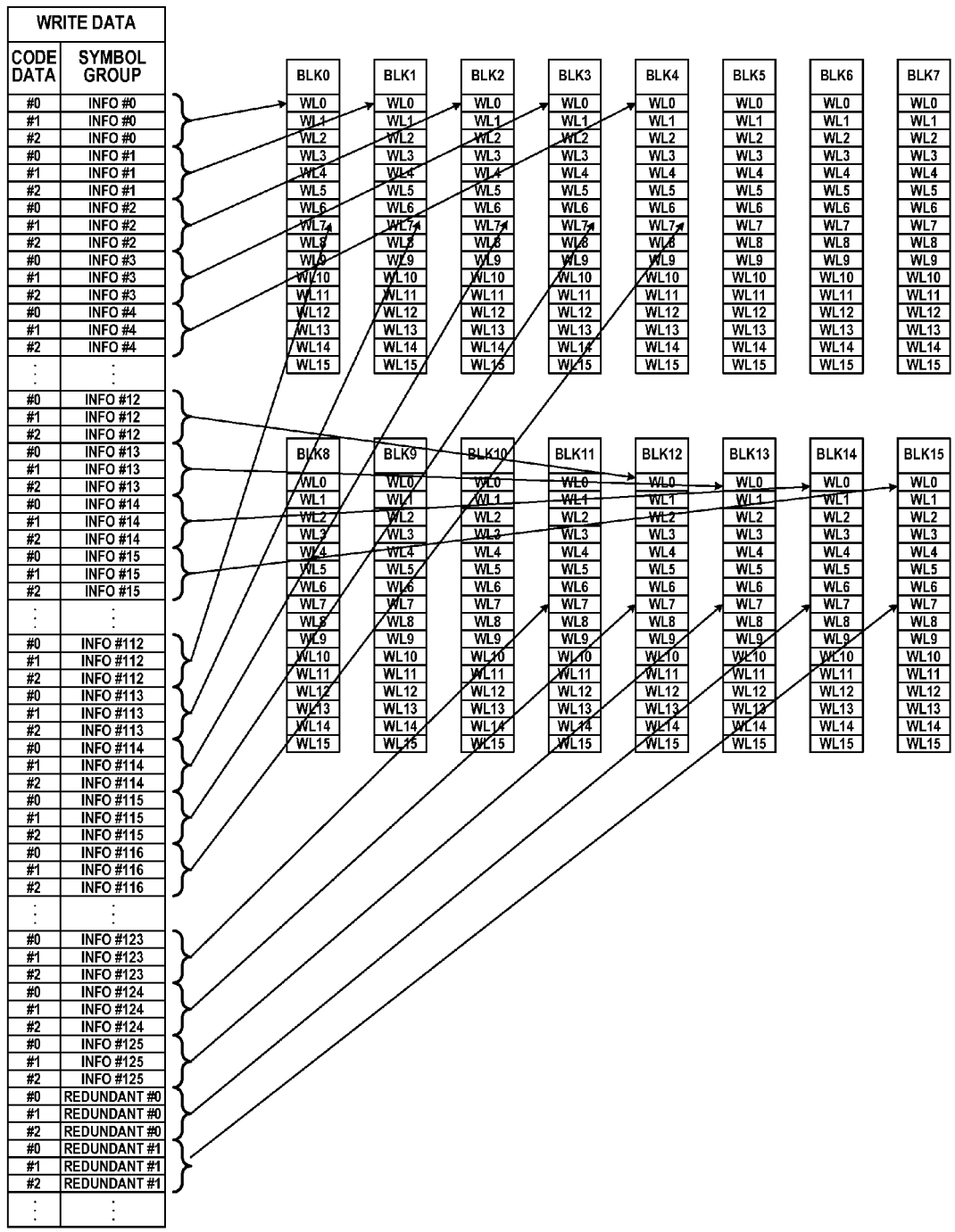
FIG. 9 illustrates an example of writing in which symbol groups included in three code data units that share one WL in each of blocks of a NAND memory, in a memory system according to a third embodiment.

FIG. 9 illustrates an example of writing in which symbol groups included in three code data units that share one WL in each of blocks of a NAND memory 3 in a memory system according to a third embodiment. In the memory system according to the third embodiment, parallel writing on each block can be performed in a plurality of memory chips in the NAND memory 3. FIG. 9 illustrates an example in which symbol groups are written in parallel on the WLs of block 0 to block 15. The blocks are physical blocks serving as physical storage regions in memory chips 31-0 to 31-n and are units of data deletion of the memory chips 31-0 to 31-n. The configuration of the memory system according to the third embodiment is the same as the configuration of the memory system 1 illustrated in FIG. 1 according to the first embodiment.

Figure 10:
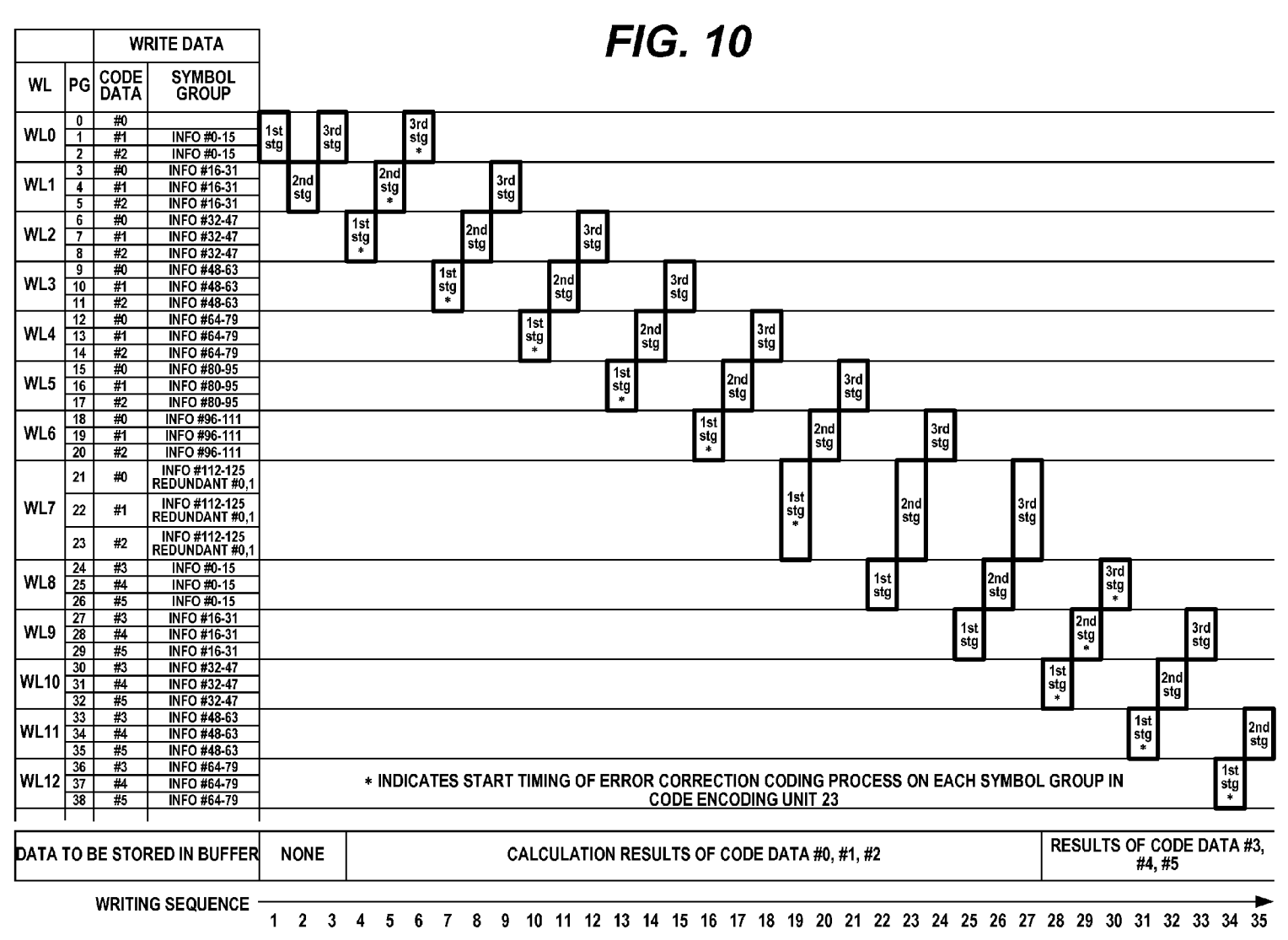

FIG. 10 illustrates a writing sequence of symbol groups of three code data units that share one WL in a memory system according to the third embodiment. FIG. 10 illustrates the writing sequence of the symbol groups illustrated in FIG. 9. In the examples of FIGS. 9 and 10, n=128, k=126, 128 symbol groups form one code data unit, 126 symbol groups of the 128 symbol groups are information symbol groups, and 2 symbol groups are redundant symbol groups. In the example of FIGS. 9 and 10, writing of data corresponding to three pages on each WL is performed from first to third writing stages. When data of the code data unit formed by the 128 symbol groups is assumed to be code data #0, code data #1, code data #2, code data #3, code data #4, and code data #5, the symbol groups of code data #0, code data #1, and code data #2 are written commonly on a WL and the symbol groups of code data #3, code data #4, and code data #5 are written commonly on a WL.

The writing sequence on the WL is the same as that of the memory system according to the second embodiment. In the example of FIG. 10, first, the first writing stage on WL0 is performed with respect to each block. Next, the first writing stage on WL1 is performed with respect to each block. Next, the second writing stage on WL0 is performed with respect to each block. Next, the first writing stage on WL2 is performed with respect to each block. Next, the second writing stage on WL1 is performed with respect to each block. Next, the third writing stage on WL0 is performed with respect to each block. By continuing the writing in the above-described way, the first to third writing stages are performed with respect to each WL. Thus, the proximity effect can be reduced by sequentially performing the first to third writing stages while changing the WLs.

FIG. 11 illustrates an example of a relationship between a writing destination and symbol groups of code data #0, code data #1, and code data #2, when the symbol groups included in three code data units share one WL in each of blocks of a NAND memory, in a memory system according to the third embodiment. When write data in writing sequence 1 of FIG. 10 is given as an example, the parallel writing is performed such that information symbol groups #0 of code data #0, code data #1, and code data #2 are written on WL0 of block 0, information symbol groups #1 are written on WL0 of block 1, information symbol groups #2 are written on WL0 of block 2, information symbol groups #3 are written on WL0 of block 3, information symbol groups #4 are written on WL0 of block 4, information symbol groups #5 are written on WL0 of block 5, information symbol groups #6 are written on WL0 of block 6, information symbol groups #7 are written on WL0 of block 7, information symbol groups #8 are written on WL0 of block 8, information symbol groups #9 are written on WL0 of block 9, information symbol groups #10 are written on WL0 of block 10, information symbol groups #11 are written on WL0 of block 11, information symbol groups #12 are written on WL0 of block 12, information symbol groups #13 are written on WL0 of block 13, information symbol groups #14 are written on WL0 of block 14, and information symbol groups #15 are written on WL0 of block 15.

The calculation of the error correction coding process for code data #3, code data #4, and code data #5 does not start at the timing of the first writing stage of the first information symbols of code data #3, code data #4, and code data #5 in writing sequence 22 of FIG. 10. Instead, the third writing stage on the WL of the redundant symbol group of code data #0, code data #1, and code data #2 ends in writing sequence 27, the region for the storage of the calculation result of the error correction coding process for code data #0, code data #1, and code data #2 is cleared from the calculation result storage buffer 27, the region for storing the calculation result of the error correction coding process with respect to code data #3, code data #4, and code data #5 is ensured in the calculation result storage buffer 27 in writing sequence 28, and then the calculation of the error correction coding process with respect to code data #3, code data #4, and code data #5 starts. That is, in regard to the first information symbols of code data #3, code data #4, and code data #5, the calculation of the error correction coding process starts to be performed at the timing of the third writing stage on the WL. In regard to the symbol groups written on the other WLs, the calculation of the error correction coding process is performed before start of the first writing stage on the final WL. In this case, only one of the calculation result of the error correction coding process for code data #0, code data #1, and code data #2 and the calculation result of the error correction coding process for code data #3, code data #4, and code data #5 is stored in the calculation result storage buffer 27. The number of redundant symbols per code data unit is two, and the symbol groups included in three code data units share are written commonly on a WL. Therefore, the region necessary in the calculation result storage buffer 27 to store the calculation result of the error correction coding process is 96 kbytes obtained by multiplying 16 kbytes, which is the size of the symbol groups, by two, which is the number of symbols, and three, which is the number of code data units sharing a WL.

In the above-described third embodiment, even when the writing of data is performed simultaneously on the plurality of blocks in which the parallel writing can be performed, the calculation of the error correction coding process is performed on the data of the symbol groups written on the first WL in the final writing stage and the calculation is performed on the data of the symbol groups written on the other WLs before the start of the first writing stage on the final WL. The regions ensured in the calculation result storage buffer 27 to store the calculation result of the error correction coding process can be suppressed to a region necessary for the calculation of the error correction coding process on the code data unit in which the WL is shared and the data is written.

The disclosure is not limited to the above-described embodiments, but may be modified in various ways within the scope of the disclosure without departing from the gist of the disclosure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a memory unit including a first subunit and a second subunit;
a code encoding unit configured to calculate first redundant data based on first write data and second redundant data based on second write data; and
a control unit configured to cause the first write data and the first redundant data to be written in the first subunit and the second write data and the second redundant data to be written in the second subunit,
wherein the first and second write data and the first and second redundant data are written through a plurality of writing steps, in each of which a part of data is written, at least one of the writing steps for writing the second write data and the second redundant data being carried out before all of the writing steps for writing the first write data and the first redundant data have been carried out, and
wherein the control unit is configured to control the code encoding unit to start calculation of the second redundant data after all of the writing steps for writing the first write data and the first redundant data have been carried out.

2. The memory device according to claim 1, further comprising:
a buffer unit configured to store first calculation data used to calculate the first redundant data and second calculation data used to calculate the second redundant data,
wherein the control unit is configured to control the buffer unit to delete the first calculation data before storing the second calculation data.

3. The memory device according to claim 1, further comprising:
a buffer unit configured to store first calculation data used to calculate the first redundant data and second calculation data used to calculate the second redundant data,
wherein the control unit is configured to control the buffer unit to delete the first calculation data after the first write data and the first redundant data have been written in the first subunit.

4. The memory device according to claim 1, wherein the control unit is configured to control the code encoding unit to start calculation of the second redundant data before all of the writing steps for writing the second redundant data are carried out.

5. The memory device according to claim 1, wherein each of the first and second subunits includes a plurality of lines, a plurality of memory cells being connected to each of the lines, and the writing steps being carried out with respect to each of the lines, and
the second redundant data starts to be calculated during a first writing step with respect to one or more of the lines.

6. The memory device according to claim 5, wherein the second redundant data is not calculated during a first writing step with respect to at least one of the lines.

7. The memory device according to claim 6, wherein a first writing step with respect to one of the lines of the second subunit in which a part of the second write data is written is carried out before a second writing step with respect to one of the lines of the first subunit in which a part of the first redundant data is written.

8. A method for writing data in a memory device including a first memory unit and a second memory unit, the method comprising:
calculating first redundant data based on first write data;
writing the first write data and the first redundant data in the first memory unit through a plurality of writing steps, in each of which a part of the first write data or a part of the first redundant data is written;
starting calculation of second redundant data based on second write data after all of the writing steps for writing the first write data and the first redundant data have been carried out; and
writing the second write data and the second redundant data in the second memory unit through a plurality of writing steps, in each of which a part of the second write data or a part of the second redundant data is written,
wherein at least one of the writing steps for writing the second write data and the second redundant data is carried out before all of the writing steps for writing the first write data and the first redundant data have been carried out.

9. The method according to claim 8, further comprising:
storing first calculation data used to calculate the first redundant data and second calculation data used to calculate the second redundant data; and
deleting the first calculation data before the second calculation data is stored.

10. The method according to claim 8, further comprising:
storing first calculation data used to calculate the first redundant data and second calculation data used to calculate the second redundant data; and
deleting the first calculation data after the first write data and the first redundant data have been written in the first memory unit.

11. The method according to claim 10, wherein
each of the first and second subunits includes a plurality of lines, a plurality of memory cells being connected to each of the lines, and the writing steps being carried out with respect to each of the lines, and
the second redundant data starts to be calculated during a first writing step with respect to one or more of the lines.

12. The method according to claim 11, wherein
the second redundant data is not calculated during a first writing step with respect to at least one of the lines.

13. The method according to claim 12, wherein
a first writing step with respect to one of the lines of the second subunit in which a part of the second write data is written is carried out before a second writing step with respect to one of the lines of the first subunit in which a part of the first redundant data is written.

14. The method according to claim 8, wherein
the second redundant data starts to be calculated before all of the writing steps for writing second redundant data are carried out.

15. A memory device comprising:
a memory unit including a plurality of memory blocks, each of which includes a first line group and a second line group, data being written in memory cells connected to each line of the first and second line groups,
a code encoding unit configured to calculate first redundant data based on first write data and second redundant data based on second write data; and
a control unit configured to cause the first write data and the first redundant data to be written in the memory cells along each line of the first line groups with respect to each of the memory blocks in parallel and the second write data and the second redundant data to be written in the memory cells along each line of the second line groups with respect to each of the memory blocks in parallel, wherein the first and second write data and the first and second redundant data are written through a plurality of writing steps with respect to each line of the first and second line groups, in each of which a part of data is written, at least one of the writing steps for writing the second write data and the second redundant data being carried out before all of the writing steps for writing the first write data and the first redundant data have been carried out, and wherein the control unit is configured to control the code encoding unit to start calculation of the second redundant data after all of the writing steps for writing the first write data and the first redundant data have been carried out.

16. The memory device according to claim 15, further comprising:
a buffer unit configured to store first calculation data used to calculate the first redundant data and second calculation data used to calculate the second redundant data,
wherein the control unit is configured to control the buffer unit to delete the first calculation data before storing the second calculation data.

17. The memory device according to claim 15, further comprising:
a buffer unit configured to store first calculation data used to calculate the first redundant data and second calculation data used to calculate the second redundant data,
wherein the control unit is configured to control the buffer unit to delete the first calculation data after the first write data and the first redundant data have been written in the first subunit.

18. The memory device according to claim 15, wherein the control unit is configured to control the code encoding unit to start calculation of the second redundant data before all of the writing steps for writing the second redundant data are carried out.

19. The memory device according to claim 15, wherein the second redundant data starts to be calculated during a first writing step with respect to one or more of the lines of the second line group.

20. The memory device according to claim 19, wherein the second redundant data is not calculated during a first writing step with respect to at least one of the lines of the second line group.

* * * * *